United States Patent
Vromans et al.

(10) Patent No.: US 10,782,163 B2
(45) Date of Patent: Sep. 22, 2020

(54) TURBINE FLOW METER, ASSEMBLY, AND METHOD FOR MEASURING AT LEAST ONE FLOW CHARACTERISTIC

(71) Applicant: KINETRON B.V., Tilburg (NL)

(72) Inventors: Frans Vromans, Tilburg (NL); Geert Maria Van Den Brekel, Tilburg (NL); Joris Paul Lodewijk Jansen, Tilburg (NL); Bernardus Johannes Meijer, Tilburg (NL); Koen Jacob Weijand, Tilburg (NL)

(73) Assignee: KINETRON B.V., Tilburg (NL)

( * ) Notice: Subject to any disclaimer, the term of this patent is extended or adjusted under 35 U.S.C. 154(b) by 0 days.

(21) Appl. No.: 16/618,738

(22) PCT Filed: May 31, 2018

(86) PCT No.: PCT/NL2018/050357
§ 371 (c)(1),
(2) Date: Dec. 2, 2019

(87) PCT Pub. No.: WO2018/222040
PCT Pub. Date: Dec. 6, 2018

(65) Prior Publication Data
US 2020/0088554 A1    Mar. 19, 2020

(30) Foreign Application Priority Data

May 31, 2017  (NL) ...................................... 2019005
Jun. 7, 2017   (NL) ...................................... 2019028

(51) Int. Cl.
*G01F 1/11*    (2006.01)
*G01F 1/07*    (2006.01)
(Continued)

(52) U.S. Cl.
CPC ................ *G01F 1/075* (2013.01); *G01F 1/08* (2013.01); *G01F 15/003* (2013.01); *G01F 25/0007* (2013.01)

(58) Field of Classification Search
CPC ..................................... G01F 1/07; G01F 1/11
See application file for complete search history.

(56) References Cited

U.S. PATENT DOCUMENTS 2,299,406 A     10/1942  Potter
7,671,480 B2 *  3/2010   Pitchford ............... G01D 4/004
                                                    290/43

(Continued)

FOREIGN PATENT DOCUMENTS

FR     2960639 A1      12/2011
WO     2012131677 A2   10/2012

OTHER PUBLICATIONS

International Search Report issued by the European Patent Office acting as the International Searching Authority in relation to International Application No. PCT/NL2018/050357 dated Sep. 13, 2018 (5 pages).

(Continued)

*Primary Examiner* — Jewel V Dowtin
(74) *Attorney, Agent, or Firm* — Robert P. Michal, Esq.; Carter, DeLuca & Farrell LLP

(57) ABSTRACT

An autonomous, low-power turbine flow meter and an assembly of at least one flow meter and at least one signal receiving device configured to receive signals, preferably in a wireless manner, produced and transmitted by the flow meter. The invention further relates to a method for measuring at least one flow characteristic, in particular the flow rate, of a fluid flowing through a flow meter.

20 Claims, 8 Drawing Sheets

(51) Int. Cl.
*G01F 1/075* (2006.01)
*G01F 1/08* (2006.01)
*G01F 15/00* (2006.01)
*G01F 25/00* (2006.01)

(56) References Cited

U.S. PATENT DOCUMENTS

| | | |
|---|---|---|
| 8,279,080 B2 | 10/2012 | Pitchford et al. |
| 8,843,241 B2 * | 9/2014 | Saberi ............... H04Q 9/00 700/287 |
| 9,360,870 B2 * | 6/2016 | Lynch ............... G05D 7/0617 |
| 9,651,400 B2 * | 5/2017 | Pitchford ............... G08C 17/02 |
| 9,695,579 B2 * | 7/2017 | Herbert ............... E03C 1/057 |
| 10,060,775 B2 * | 8/2018 | Ruiz Cortez ......... G01F 15/063 |
| 10,203,232 B2 * | 2/2019 | Neilson ............... G01F 1/115 |
| 2008/0022920 A1 | 1/2008 | Custodis |
| 2014/0286802 A1 | 9/2014 | Singh |

OTHER PUBLICATIONS

Written Opinion of the International Searching Authority issued by the European Patent Office acting as the International Searching Authority in relation to International Application No. PCT/NL2018/050357 dated Sep. 13, 2018 (11 pages).

\* cited by examiner

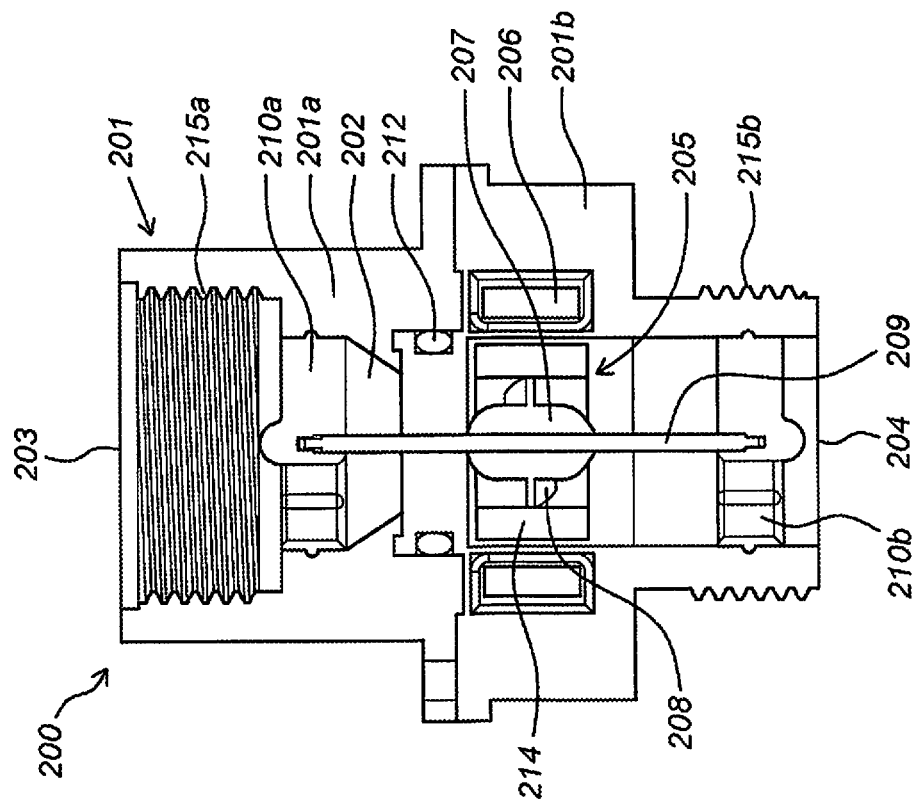
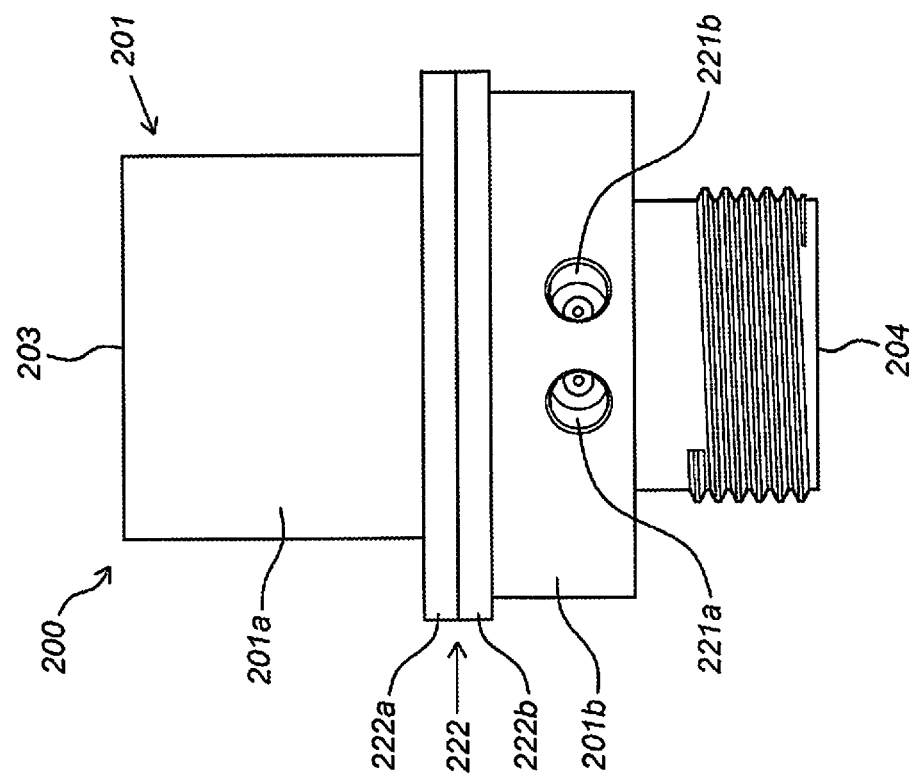
Fig. 2b
Fig. 2a

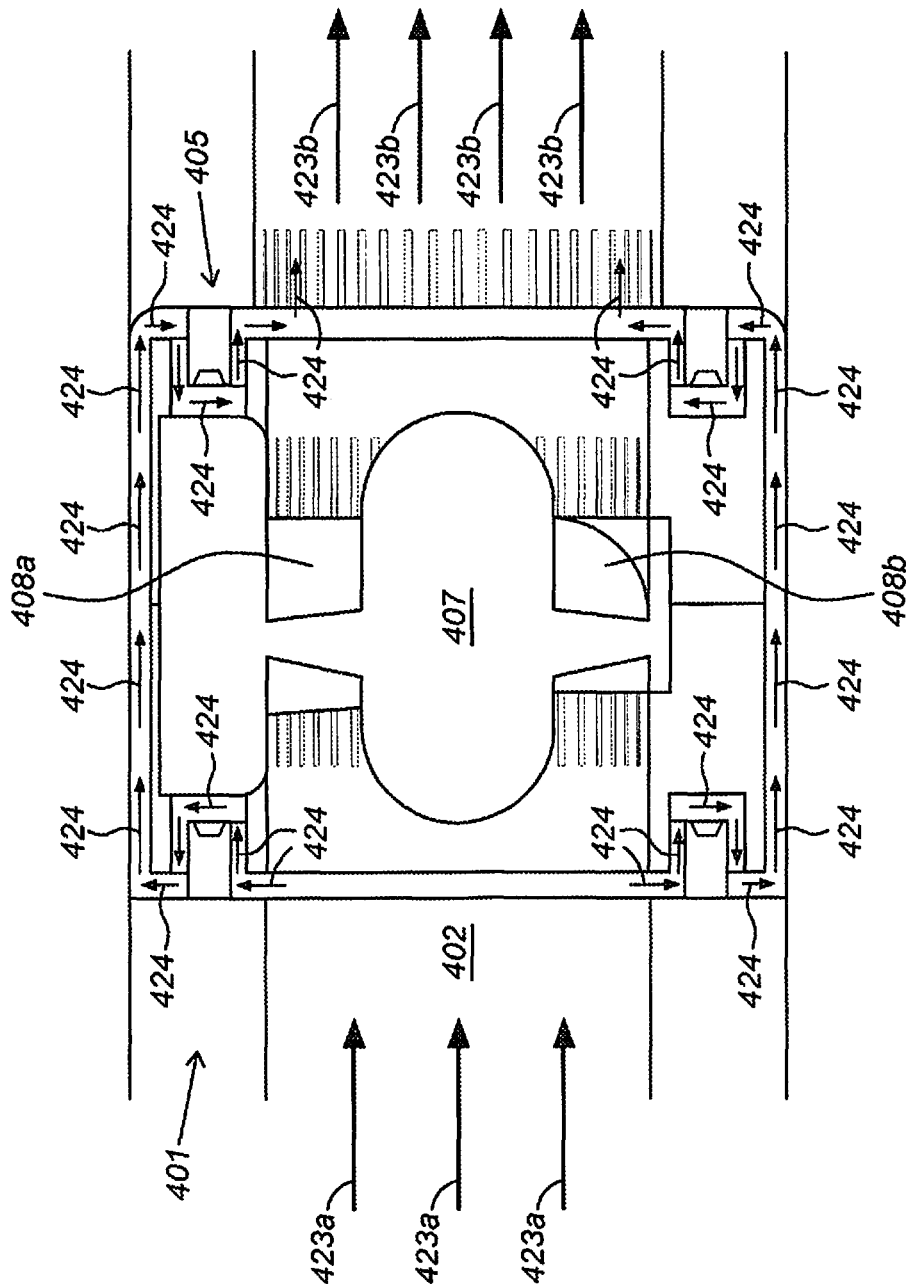

TURBINE FLOW METER, ASSEMBLY, AND METHOD FOR MEASURING AT LEAST ONE FLOW CHARACTERISTIC

CROSS-REFERENCE TO RELATED APPLICATIONS

This application is a national phase entry under 35 U.S.C. 371 of PCT International Application No. PCT/NL2018/050357 filed May 31, 2018, which claims priority to Netherlands Patent Application No. 2019005, filed May 31, 2017 and Netherlands Patent Application No. 2019028, filed Jun. 7, 2017, the disclosure of each of these applications is expressly incorporated herein by reference in their entirety.

The invention relates to an autonomous, low-power (micro)turbine flow meter. The invention also relates to an assembly of at least one flow meter according to the invention and at least one signal receiving device configured to receive signals, preferably in a wireless manner, produced and transmitted by said flow meter. The invention further relates to a method for measuring at least one flow characteristic, in particular the flow rate, of a fluid flowing through a flow meter, in particular a flow meter according to the invention.

Many different types of flow meters are used in industry and at home. Among these different types of flow meters, the turbine flow meter is one of the most commonly used. A turbine rotor, impeller or rotating member is disposed in the turbine flow meter, wherein the fluid flow, such as the flow rate, is measured by the number of revolutions per time unit of said turbine rotor or impeller. Fluid entering the turbine flow meter causes the rotor to rotate, after which the fluid exits the flow meter.

However, prior art flow meters as described above need external power sources to become operational. Moreover, the known flow meters typically make measurements of fluid flow rates inaccurate. The present invention has been made in an effort to solve at least one of the above problems.

It is an object of the present invention to provide an autonomous, low-power turbine flow meter that can measure at least one flow characteristic, in particular the flow rate, of a fluid flowing through said flow meter, in a relatively accurate manner.

It is another object of the present invention to provide an autonomous, low-power turbine flow meter that can measure at least one flow characteristic, in particular the flow rate, of a fluid flowing through said flow meter, in a reproducible manner.

To achieve at least one of the above objects, the present invention provides an autonomous, low-power (micro)turbine flow meter, comprising: a housing enclosing a single interior channel with a fluid inlet and a fluid outlet, wherein said housing is adapted to be coupled to a and/or accommodated within and/or integrated with a conduit through which a fluid is caused to flow; at least one turbine held in place by said housing, wherein each turbine comprises: a stator connected to said housing, and an axially rotatable rotor with blades, said rotor being connected to a shaft held in place by at least one bearing element connected to said housing, wherein said rotor is positioned within said single interior channel such that at least a fraction of fluid and/or sufficient fluid (to allow a (proper) flow characteristic measurement), preferably substantially all fluid, led into said single interior channel will flow through the rotor, and wherein said turbine is configured to generate electric energy from fluid flowing through said interior channel, and wherein said turbine is configured to produce at least one flow characteristic related signal related to the fluid flowing through the single interior channel; and at least one electric signal processing circuit powered by said turbine, said circuit comprising at least one signal processing element, wherein at least one signal processing element is configured to process said at least one flow characteristic related signal. Preferably, during the production of the flow characteristic related signal by the turbine and/or during the processing of said signal by at least one signal processing element, the signal processing circuit uses an electric load of the circuit and/or uses an electric load related characteristic of the circuit, (more) preferably to determine and/or influence the signal production of the turbine and/or the signal processing of at least one signal processing element. Hence, the circuit is configured to use the electric load and/or electric load related characteristics, during the production of the flow characteristic related signal by the turbine and/or during the processing of said signal by at least one signal processing element, in order to determine and/or influence (manipulate) the signal production of the turbine and/or the signal processing of the at least one flow characteristic related signal by said at least one signal processing element. The flow meter according to the invention has several advantages. A first advantage of the flow meter according to the invention is that a single interior channel is applied for flow-through of fluid, wherein no branched fluid conduits and/or (dedicated) bypass fluid channels (bypass conduits) are applied within the housing which could cause a fluid fraction to bypass the rotor, as a result of which all fluid fed into the flow meter is led through said single channel from the inlet to the outlet, and hence as a result of which the full fluid fraction, or at least a relevant part of the fluid fraction, contributes to the measuring of at least one flow related characteristic. This leads to a relatively accurate, predictable, repeatable and reproducible measurement of the flow related characteristic of the fluid flow as such. A second advantage is that the single channel in combination with the (axial) reaction turbine enables the use of the flow meter according to the invention over a wide flow range with an acceptable pressure drop, without the need for a bypass channel and/or bypass valve to reduce the pressure drop at higher flow rates. This is due to the less steep pressure drop curve of reaction turbines compared to more commonly used impulse (nozzle) turbines for power generation, which are often used in combination with a bypass channel and bypass valve to reduce the pressure drop at higher flow rates. The fluid passing the bypass channel makes an accurate flow measurement more complex, or even impossible, so a separate flow sensor is used when an accurate flow measurement is needed. Therefore, using the single channel, combined with an (axial) reaction turbine leads to a small, low cost and accurate flow meter which can be used over a wide flow range without the need for a bypass and without the need for a separate flow sensor. A third advantage of the flow meter according the invention is that the flow meter, including the housing, turbine, bearings and electronics (in particular the signal processing circuit), is designed to have the maximum efficiency of power generation and with a minimum impact on the flow measurement accuracy, repeatability and reproducibility leading to a compact, predictable, accurate and low cost flow meter which is (re)producible against reasonable cost. Another advantage of the flow meter according to the invention is that the flow meter is designed to operate in an autonomous manner. This means the electrical energy required to power the circuit is generated by and originating from the turbine. Hence, no auxiliary (external) power sources, like batteries or mains power, are required to power the circuit. Batteries are environmental unfriendly and need replacement, leading to higher cost. A connection to the mains power supply requires cabling, which is not always desired and leads to higher costs of installation and sometime to unsafe situations. Moreover, since the flow meter comprises all components to determine one or more fluid flow characteristics, the flow meter is a complete plug-and-play device operating in an autonomous manner. The turbine, also referred to as generator, in particular alternator, used in the flow meter according to the invention is a low-power turbine configured to generate electrical power ranging from several milliWatt to typically 10 Watt. Hence, the expression "low-power" should be understood as 10 Watt or less in the context of this patent document. The actual power generated is dependent on the number of the revolutions of the rotor (per time interval). Commonly, at least 5 to 200 milliWatt is sufficient to operate the circuit and to generate at least one flow characteristic related signal by means of at least one signal processing element. The stator can for example comprise one or more coils. The rotor is preferably an axial reaction type rotor, with blades and one or more permanent magnets. The flow meter, and in particular the housing, is configured to be coupled to a (first) fluid conduit, such that fluid can flow from the flow conduit into the inlet of the single interior channel of the flow meter. Preferably, the flow meter, and in particular the housing, is configured to be coupled to a fluid conduit, such that fluid leaving the interior channel via the outlet is led into a (second) fluid conduit. The first fluid conduit and the second fluid conduit may actually be formed by the same conduit which is interrupted for insertion or accommodation of the flow meter according to the invention. Coupling the flow meter, in particular the housing, to the fluid conduit can be realized in various manners, for example by means of an internal and/or external screw thread, a clamp fitting and/or a snap fitting. In the context of this patent document, the expression "fluid conduit" has to be understood broadly and includes the non-limitative examples: fluid conduit pipes, fluid conduit fittings (configured to either directly or indirectly mutually connect fluid conduit pipes), other fluid conduit components, and/or complete fluid conduit applications, such as a water tap or a water shower. The fluid conduit encloses one or more fluid channels through which fluid can flow. In the context of this patent document, the expression "fluid" may relate to a liquid, such as water, and/or may relate to a gas, such as air or natural gas, and/or may relate to a mixture of liquid and gas, such e.g. steam or carbonated liquid. A fluid flowing through the interior channel acts a force onto the (inclined) blades of the axial flow reaction turbine. This force causes the rotor to axially rotate, resulting in generation of alternating current (AC) electrical power by said turbine, which is at least partially used to power the signal processing circuit. An AC voltage and/or AC current is generated by the turbine, wherein the actual AC waveform (sinusoidal waveform) is representative for the rotation speed (i.e. number of revolutions per time unit) of the rotor. In case the fluid flow through the flow meter e.g. becomes stronger, the rotation speed of the rotor will increase, which leads to a relatively dense (strongly fluctuating) AC waveform. Hence, the AC waveform generated by the turbine contains important information relating the actual flow of the fluid, which can be used, and optionally transformed, by at least one signal processing element (also referred to as a processor) to generate at least one (other) flow characteristic related signal, commonly primarily intended for information and/or interpretation and/or control purposes. Hence, the turbine can be considered as signal producing element. Although it is not required that the signal processing element modifies (transforms) the input signal, which may be an AC frequency, generated by the turbine, the signal processing element may have, for example, mere a forwarding function to forward, optionally wirelessly, the input signal unmodified (as raw data) to a signal receiver for e.g. further processing, it is well imaginable that the signal processing element transforms the input signal generated by the turbine. This transformation may, for example, be based on an a simple electronic circuit converting the AC signal into another electric signal and/or a processor using a formula, algorithm and/or a database (table) containing cross-references, to determine a flow characteristic value based on rpm and co-related, possibly already transformed, AC waveform signal (voltage, frequency, etc.). In case the signal processing element is configured to modify (transform) the input signal received, the signal processing element may also be considered as signal producing element. In the following, reference is typically made to a signal producing element, since it is commonly advantageous to transform the input signal received from the turbine. However, this does not exclude that in the embodiments described below, a (passive) signal processing element (not being configured to transform the input signal received) can be used rather than an (active) signal producing element. The produced flow characteristic related signal(s) may e.g. constitute a flow volume value, a flow rate, and/or a flow direction. Apart from the fact that the AC signal generated by the turbine can be used as input signal for the signal processing element, in particular the signal producing element, other types of input signals can be used. It is, for example, thinkable that the flow meter, and in particular the turbine, is equipped with other input signal producing elements, like (electro)magnetic contacts and/or sensors configured to produce flow characteristic related input signals, such as a magnet mounted by the rotor and a hall sensor or Reed contact mounted by the housing and/or electrical circuit. These (electro)magnetic contacts and/or sensors may be considered as part of the turbine. Hence, the definition of turbine also includes components, parts, sensors, switches, magnets, signal producing elements attached to, integrated (in)to, and/or co-acting with the turbine and more particular the stator and/or the rotor. Alternatively, the flow meter can be equipped with sensors, detection elements, and/or (electro)magnetic contacts configured to generate other signals relating to (other) fluid and/or surrounding environmental characteristics, such as the temperature, humidity, fluid quality, etcetera. Hence, simultaneously (or successively) multiple input signals can be generated, at least one of which relates to the flow characteristic of the fluid and at least one other of which relates to another fluid and/or surrounding environmental characteristic. These input signals may be processed by a plurality of signal processing elements (which may be mutually connected in series and/or in parallel) of the processing circuit, either simultaneously and/or successively, although it is also well conceivable that a plurality, preferably all, input signals are processed, and optionally transformed, by one central signal processing element, in particular one central processing element. The central signal processing element is optionally configured to produce a single output signal, preferably containing a summary and/or calculation (i.e. average or total value) of the input signals, based upon said multiple input signals, enabling the flow meter to produce more complex combinations and/or calculated signals for example related to the energy in the fluid flow calculated from the flow rate and fluid temperature. Hence, it is imaginable that a first signal producing element is configured to produce a fluid flow rate related signal, and that a second signal producing element is configured to produce a fluid flow direction related signal, and that a third producing element is configured to produce a fluid flow volume related signal. The produced signal(s), i.e. the flow characteristic related signal(s) may, for example be generated and/or calculated and/or transmitted, continuously in time and/or at predefined time intervals. The signals may be used by a central processor to control other components of the circuit and/or may be directly communicated, in particular visualised, to a user of the flow meter and/or to (wirelessly) inform users or other devices and/or (wirelessly) control other devices. Optionally the flow meter may comprise a plurality of the turbines, which may be positioned in line with each other and/or next to each other, as seen in longitudinal or latitudinal direction, causing fluid to flow successively or in parallel through both turbines.

Preferably, the single interior channel is a substantially linear (straight or curved) channel. A linear channel minimizes the flow resistance for the fluid flow through said channel. Here, the inlet of the channel and the outlet of the channel is positioned in line with each other. The single interior channel and the shaft connected to the rotor preferably extend in substantially the same direction. The shaft connected to the rotor is preferably positioned in the centre of the single interior channel. This configuration commonly leads to an effective axial flow reaction turbine to be used in the flow meter. Since the flow meter according to the invention will typically (also) be used to measure the water flow characteristics of water flowing through a regular water conduit, preferably, the diameter of the single interior channel is smaller than or equal to 22 mm.

In a preferred embodiment, the outer diameter of the rotor substantially corresponds to the inner diameter of the single interior channel. Preferably, the rotor engages an inner surface of the housing and/or wherein the distance between the rotor and an inner surface of the housing is smaller than 0.5 mm. This minimized space between outer edge(s) of the rotor and the inner surface of the housing (inner housing wall), defining the channel, minimizes (undesired) leakages of fluid in between said space. Here, it is preferred that an optional fluid bypass path enclosed by the outer edge(s) of the rotor and the inner surface of the housing is provided with one or more flow obstacles, such as walls, angles, ridges, and/or flanges, forming a kind of labyrinth, forcing the fluid to follow a, preferably non-linear (complicated), path with a relatively high flow resistance, which will force the fluid to flow through the rotor (in between the rotor blades) rather than to bypass the rotor. The expression "non-linear" path should be understood as a fluid flow fluid being distinctive from a straight (linear (or one-dimensional) path. The "non-linear" path has a two-dimensional or three-dimensional configuration, and is typically composed of a plurality of mutually connected path segments, wherein adjacent path segment enclose an angle with respect to each other forcing the fluid to change direction while flowing through said path. This leads to a high efficiency, higher power and a stable efficiency, power and flow-rpm relation even in case of rotor position changes or rotor misalignment during production or use (or wear) of the flow meter. Preferably, a labyrinth is used that creates enough flow resistance to enable the use of a relatively big and dirt resistant channel, but with limited flow that bypasses the rotor. Also, preferably a self-regulating labyrinth is used, in which the flow that would bypass the rotor is independent or less dependent on axial or radial movement or misalignment of the rotor. For example, and with reference to FIG. 4, the flow through the labyrinth is independent of both axial and radial movement or misalignment of the turbine, because the total cross-section surface of the fluid bypass path, and the related fluid flow through the bypass path, will not change when the position of the rotor changes radially or axially. Finally, although it might have a negative impact on the power generated and on the efficiency, it is imaginable that for high flow rate flow meters this bypass will be deliberately used to create a small bypass to reduce the pressure drop at high flow rates.

The rotor preferably comprises a support structure, also referred to as a rotor casing, enclosing (circumventing/surrounding) the blades of the rotor, wherein said support structure is provided with at least one (multipole) magnet, in particular an annular magnet. Here, it is often advantageous to provide the support structure with a plurality of (dipole) magnets, also known as bar magnets, arranged alternatingly, together forming an annularly shaped (multipole) magnet assembly. Other magnet based arrangements are also conceivable. The housing may comprise an annular accommodating space for accommodating an upper end of the support structure. Such an accommodating space creates a kind of labyrinth, which will increase the flow resistance for the fluid to bypass the rotor (as already addressed above), and which will force the fluid to flow through the rotor.

During rotation of the rotor, the at least one magnet of the rotor co-acts with the stator, leading to the generation of electrical energy. The stator is typically formed by at least one metal (e.g. iron or steel) ring and/or by at least one field winding, in particular at least one coil, which is arranged in the axial direction outside the radial projection of the rotor, and claw-pole-like magneto-conductive sheets, preferably 8, 10, 12, 14, or 16 sheets, guided axially in the radial projection of the rotor. The rotor is typically at least partially surrounded by the stator. In an alternative embodiment, during rotation of the rotor, at least one magnet of the rotor co-acts with at least one field winding, in particular at least one coil, which is arranged outside the radial projection of the rotor. Such a field winding may be considered to act as stator. In this embodiment, the field winding leads to no holding torque of the magnet in the stator, leading to a lower starting flow of the turbine and a wider measuring range.

At least one, and preferably both, bearing elements commonly co-acts with an outer end of the shaft of the rotor. The bearing elements should be sufficiently robust to keep the rotor in place, though are preferably as lean as possible in order to minimize flow resistance for the fluid and bearing friction caused by said bearing elements.

In order to secure that all fluid flowing through the single interior channel will contribute to the axial rotation of the rotor, it is advantageous that adjacent blades of the rotor overlap each other in longitudinal direction. The blades are preferably regularly oriented with respect to the shaft of the rotor. Typically each rotor comprises 3, 4, 6, 8, or more than 8 blades, although alternative embodiments are also conceivable. Each blade of the rotor preferably has a curved geometry providing each blade a three dimensional design. Preferably, the angle enclosed by an inner portion of each blade and the shaft of the rotor is smaller than the angle enclosed by an outer portion of each blade and the shaft. For the purpose of measuring flow characteristics, this kind of blade design commonly leads to the most accurate flow measuring results. Preferably, the angle enclosed by an inner portion of each blade and the shaft of the rotor is between 0 and 60 degrees, preferably between 30 and 55 degrees. Preferably, the angle enclosed by an outer portion of each blade and the shaft is between 40 and 90 degrees.

In a preferred embodiment, the flow meter comprises a controllable valve for at least partially closing the single interior channel. By controlling the valve, the interior channel can be fully opened (allowing flow-through of fluid), partially closed or substantially fully closed (preventing fluid to flow-through the flow meter). The controllable valve is commonly electronically connected to a central processor of the signal processing circuit. The central processor may control the valve to close the channel, for example in case a flow exceeds a predefined maximum flow. Hence, the central processor may be formed by a signal processing element and/or may be connected, directly or indirectly, to at least one (other) signal processing element, in particular at least one other signal producing element (if applied), configured to control the valve based upon the flow and/or surrounding environment related signal(s), produced by at least one signal processing and/or signal producing element. Also, it is possible that the signal processing circuit, (wirelessly) receives signals from an external device or user, possibly based on its own flow- and/or surrounding environmental related signals, to control the valve. i.e. the flow meter transmits signals relating to the flow of the fluid to a receiver and when a predefined set value is achieved the receiver transmits the command to (partially) close the valve.

The signal processing element is preferably configured to transform at least one flow related signal into at least one other signal, preferably representative for the flow of the fluid through the single interior channel. The signal processing element may be part of, or may be formed by, aforementioned central processor.

In a preferred embodiment, the circuit comprises at least one temperature sensor, configured as signal producing element to produce a signal representative for the temperature of the fluid flowing through the single interior channel. By using a temperature sensor, the temperature of the fluid may also be measured and communicated to a user. The same applies in case other types of sensors would be applied in the flow meter, configured to measure other fluid characteristics, like the humidity, quality, pressure, viscosity, translucency of the fluid or other surrounding characteristics.

The circuit may comprise at least one signal processor (which may be the same processor as referred to above) and at least one indicator light, wherein the signal processor is configured to control the indicator light, based upon the signal received from at least one signal processing and/or signal producing element and/or to control the light based on externally received signals. Optionally, the light colour generated by the indicator light is controlled by the signal processor, wherein, for example, green light can be generated during normal operation and red light can be generated in case an abnormal situation is detected (e.g. malfunctioning of the turbine, excessive flow rates, etc.), which allows a user to quickly monitor the actual state and operation of the flow meter.

The circuit preferably comprises at least one storage for storing electrical energy, in particular a capacitor or a rechargeable battery. This (temporarily) stored energy can be used at moments in time, wherein the turbine does not produce (sufficient) power to power the circuit due to situation wherein no or less fluid flows through the channel and/or when the turbine is shut down to perform a no-load or limited load flow characteristic measurement.

Preferably, the circuit comprises at least one electronic transmitter configured to transmit at least one signal to an external receiver, wherein the transmitter is preferably configured for wireless communication. The flow meter may (also) comprise at least one electronic receiver configured to receive signals from an external transmitter, preferably via wireless communication. This receiver may be integrated with the signal processor. The received signals may be used or transformed by the signal processor e.g. into an output signal which can be observed by a person. Examples of such output signals are visual signals and/or audio signals. To this end, the unit preferably comprises at least one light generating source and/or at least one sound generation source. Also, the received signals may be used to control the flow meter or parts of the flow meter, for example to control an integrated valve.

Preferably, the signal processing circuit is configured to disconnect, and/or reduce, and/or regulate, and/or predict and/or measure the electric load of the circuit and/or at least one electrical load related characteristic of the circuit, preferably to determine at least one flow characteristic of the fluid. Examples of load related characteristics of the circuit are: the power, resistance, impedance, voltage or current either of the circuit as such and/or of a defined position (location) within the circuit. The electrical load can be measured directly. The electrical load of the circuit can also be measured indirectly by using and/or measuring at least one electrical load related characteristic. The signal processing circuit preferably regulates and/or uses the (actual) electrical load and/or the (actual) load related characteristic to determine at least one flow characteristic of the fluid. The actual flow characteristic related parameter, such as the rpm which is related to the flow rate, is dependent on the actual load of the electric circuit. A higher electrical load will namely impede rotation of the rotor, while a reduced electrical load (or even no load) allows the rotor to axially rotate in a relatively unhindered manner. By using (e.g. by predefining and/or by regulating and/or by predicting and/or by measuring) the electric load (or one or more characteristics related thereto), a flow value, such as the flow rate, can be determined in a relatively simple, accurate, repeatable and reproducible manner. Here, the actually measured flow characteristic will typically be determined and/or corrected based upon the influenced and/or actual (predicted) load and/or the actual (predicted) load related characteristic of the circuit, i.e. by using a correction factor, a (load related) flow-rpm table and/or a (load related) formula or algorithm, which preferably are stored in the memory of the processor. To this end, during measurement of the flow characteristic(s) the load may be reduced to zero, though may also be regulated to a predefined constant or predictable value. It is advantageous in case the electronic circuit comprises an electrical load regulating circuit, which may for example be configured—commonly by using a processor—to (partly) disconnect the load and/or to apply a constant and/or predefined and/or minimum and/or maximum load related parameter value of at least one parameter chosen from the group consisting of: power, voltage, current, load, and impedance. The regulation is commonly an electronic regulation. Since the determination of the desired flow characteristics is commonly dependent on the electrical load of the circuit, regulating said load will commonly improve the simplicity, repeatability, reproducibility and accuracy of the flow characteristic measurement. Consequently, this may also reduce the need for individual calibration of each product, enabling a more simple, reproducible and less costly production process. Especially the no-load or reduced load measurement has the advantage that it, besides eliminating or reducing the influence of the load, it also eliminates or reduces the influence of the variation in generator performance on the flow measurement. In case a continuous (repeating) no load measurement and/or a regulated load measurement are undesirable, these measurement methods can be used periodically to self-calibrate the flow meter and to correct the flow characteristic(s) measurement for load variations and/or generator performance variations, by creating, updating or correcting the formula, algorithm, correction factor and/or cross-reference table, which may be (pre)stored in a memory of the electronic circuit and/or the processor, hence making (individual) measurement and pre-programming of the flow-rpm-load relation and/or (individual) calibration unnecessary, leading to a simpler, less costly, reproducible flow meter.

Preferably, the circuit comprises at least one electrical switch connected to and controllable by at least one signal processor of the circuit. The signal processor may be the same signal processor as referred to above. The application of one or more electrical switches makes it possible to disconnect at least a part of the electric circuit from the turbine, and preferably also of the signal producing element, which reduces the electrical load of the circuit impeding rotation of the rotor. Preferably the load is reduced to zero, or at least to a predefined (known) reduced load. This temporary disconnection allows the rotor to rotate more freely (more unhindered) during the period of measuring one or more flow characteristics, which is commonly in favour of the accuracy of the measurement results. Preferably, the electrical load is reduced and/or influenced for a certain period before the actual flow characteristic measurement is done. The duration of this period can be related to the time needed to increase and/or stabilize the speed of the rotor, which can be defined by a fixed period of time in seconds (e.g. 3, 5, or 10 seconds) and/or by monitoring and/or calculating and/or predicting the increase and/or stabilization of the speed of the rotor.

It is also conceivable to measure and/or calculate and/or predict the load or one or more load related characteristics during the measurement of the fluid flow, in order to subsequently calculate, determine, and/or correct the measured flow characteristic value(s) based upon the measured and/or calculated and/or predicted load. Commonly, there will be a known relation between load and/or one or more load related characteristics and flow characteristics, which relation may be stored, for example as a formula, algorithm or a cross-reference table, which may be (pre)stored in a memory of the electronic circuit and/or the memory of the processor. Commonly, there will be a known relation between load and/or one or more load related characteristics, rpm and flow characteristics, which relation may be defined in a formula (algorithm) and/or which may be stored, for example as cross-reference table, in a database (e.g. a flow-rpm-load database), which database may be (pre)stored in a memory of the electronic circuit and/or the memory of the processor.

The invention also relates to an assembly of at least one flow meter according to the invention and at least one signal receiving device configured to receive signals produced and transmitted by said flow meter. Preferably, the flow meter and at least one signal receiving device are configured to communicate wirelessly.

The invention further relates to a method for measuring at least one flow characteristic, in particular the flow rate, of a fluid flowing through a flow meter according to the invention, comprising the steps of: A) allowing a fluid to flow through the single interior channel causing the fluid to act a force onto the blades of the rotor resulting in axial rotation of the rotor and the generation of alternating current (AC) electrical energy, wherein the alternative current and/or the alternating voltage (AC voltage) is representative for the number of revolutions (rpm) of the rotor, and wherein substantially all fluid, or at least sufficient fluid (e.g. >90% of the total fluid flowing through led into the interior channel), flows through the rotor, B) powering at least one electric signal processing circuit by said electrical energy, C) detecting the number of revolutions (rpm) of the rotor by means of said circuit, and D) producing at least one flow characteristic, in particular flow rate, related signal related to the fluid flowing through the single interior channel, based upon the detected number of revolutions (rpm) of the rotor, and based upon a predefined relation between the number of revolutions (rpm) of the rotor and said flow characteristic, in particular the flow rate. Steps A) and B) and C), and optionally D), may overlap in time. Preferably, during step C) the turbine operates either substantially without electric load of the circuit or with a, preferably regulated, predefined (constant) electric load of the circuit. Preferably, during step C) the electrical load and/or one or more load related characteristics of the circuit is measured and/or predicted and/or calculated, and wherein during step D) at least one flow characteristic, in particular flow rate, related signal related to the fluid flowing through the single interior channel is produced, which is based upon the detected number of revolutions per time unit (typically per minute) (rpm) of the rotor, and which is based upon a predefined relation between the (rpm) of the rotor and said flow characteristic, in particular the flow rate, and which is based upon the electrical load (and/or one or more load related characteristics) measured and/or predicted and/or calculated during step C). During step D) an electrical load and/or one or more load related characteristics dependent flow characteristic correction factor is preferably retrieved from a prestored cross-reference database (e.g. a flow-rpm database or a flow-rpm-load database) to correct the measured flow characteristic based upon the load detected during step C). Alternatively, during step D) and/or one or more load related characteristics an electrical load dependent flow characteristic correction factor may be calculated by using one or more algorithms (formulas). Disconnecting and/or regulating and/or predicting and/or measuring of the electrical load and/or one or more load related characteristics of the circuit allows the flow-meter to be subjected to a self-calibration based upon the electrical load or load related characteristics measured, predicted and/or predefined (preset) during step C). The load regulations and/or one or more load related characteristics regulations described above typically can have the advantage, that they can be used to limit the generated energy and to not generate more energy than strictly is needed for the flow meter functions, which prevents the electric circuit to heat up which is positive for the life time and impact on the optional temperature measurement, also not generating more energy than needed increases the life time of hydraulic mechanical components like bearings and rotor blades because the forces and stresses are minimized.

Preferred features of the invention are set out in the following clauses:

1. Autonomous, low-power turbine flow meter, comprising:
    a housing enclosing a single interior channel with a fluid inlet and a fluid outlet, wherein said housing is adapted to be coupled to and/or accommodated within a conduit through which a fluid is caused to flow;
    at least one turbine held in place by said housing, wherein each turbine comprises:

a stator connected to said housing, and an axially rotatable rotor with blades, said rotor being connected to a shaft held in place by at least one bearing element connected to said housing, wherein said rotor is positioned within said single interior channel such that at least a fraction of fluid, preferably substantially all fluid, led into said single interior channel will flow through the rotor, and wherein said turbine is configured to generate electric energy from fluid flowing through said interior channel, and wherein said turbine is configured to produce at least one flow characteristic related signal related to the fluid flowing through the single interior channel; and at least one electric signal processing circuit powered by said turbine, said circuit comprising at least one signal processing element, wherein at least one signal processing element is configured to process said at least one flow characteristic related signal.

2. Flow meter according to clause 1, wherein the single interior channel is a substantially linear channel.

3. Flow meter according to clause 1 or 2, wherein the single interior channel and the shaft connected to the rotor extend in substantially the same direction.

4. Flow meter according to one of the foregoing clauses, wherein the shaft connected to the rotor is positioned in the centre of the single interior channel.

5. Flow meter according to one of the foregoing clauses, wherein the outer diameter of the rotor substantially corresponds to the inner diameter of the single interior channel.

6. Flow meter according to one of the foregoing clauses, wherein the rotor engages an inner surface of the housing and/or wherein the distance between the rotor and an inner surface of the housing is smaller than 0.1 mm.

7. Flow meter according to one of the foregoing clauses, wherein the rotor comprises a support structure enclosing the blades of the rotor, wherein said support structure is provided with at least one magnet, in particular an annular magnet.

8. Flow meter according to clause 7, wherein said support structure is provided with a multipole magnet and/or a plurality of magnets, in particular dipole magnets, together forming an annular magnet assembly.

9. Flow meter according to clause 7 or 8, wherein the housing comprises an annular accommodating space for accommodating an upper end of the support structure.

10. Flow meter according to one of clauses 7-9, wherein, at least during rotation of the rotor, the at least one magnet of the rotor co-acts with the stator.

11. Flow meter according to one of foregoing clauses, wherein, the stator is arranged to circumvent at least a part of the rotor.

12. Flow meter according to one of the foregoing clauses, wherein at least one bearing element co-acts with an outer end of the shaft of the rotor.

13. Flow meter according to one of the foregoing clauses, wherein adjacent blades of the rotor overlap each other in longitudinal direction.

14. Flow meter according to one of the foregoing clauses, wherein the blades of the rotor are regularly oriented with respect to the shaft of the rotor.

15. Flow meter according to one of the foregoing clauses, wherein the blades of the rotor have a curved geometry.

16. Flow meter according to one of the foregoing clauses, wherein the angle enclosed by an inner portion of each blade and the shaft of the rotor is smaller than the angle enclosed by an outer portion of each blade and the shaft.

17. Flow meter according to one of the foregoing clauses, wherein at least three, and preferably all, adjacent blades of the rotor overlap each other in longitudinal direction.

18. Flow meter according to one of the foregoing clauses, wherein each rotor is provided with 3, 4, 6 or 8 blades.

19. Flow meter according to one of the foregoing clauses, wherein the flow meter is substantially free of any bypass conduit connected to said single interior channel.

20. Flow meter according to one of the foregoing clauses, wherein a non-linear fluid bypass path is enclosed by at least one outer edge of the rotor and an inner surface of the housing.

21. Flow meter according to one of the foregoing clauses, wherein the diameter of the single interior channel is smaller than or equal to 22 mm.

22. Flow meter according to one of the foregoing clauses, wherein the flow meter comprises a controllable valve for at least partially closing the single interior channel.

23. Flow meter according to one of the foregoing clauses, wherein at least one of said signal processing element is configured to produce at least one flow rate characteristic related signal related to flow rate of the fluid flowing through the single interior channel.

24. Flow meter according to one of the foregoing clauses, wherein at least one of said signal processing element is configured to produce at least one flow direction characteristic related signal related to flow direction of the fluid flowing through the single interior channel.

25. Flow meter according to one of the foregoing clauses, wherein the signal processing element is configured to transform at least one flow related signal into at least one other signal, preferably representative for the flow of the fluid through the single interior channel.

26. Flow meter according to clause 22 and clause 25, wherein at least one of said signal processing elements is configured to control the valve based upon the flow related signal product by at least one signal processing element.

27. Flow meter according to one of the foregoing clauses, wherein the circuit comprises at least one sensor, configured as signal processing element to produce a signal representative for at least one fluid characteristic, other than a fluid flow characteristic, of the fluid flowing through the single interior channel.

28. Flow meter according to one of the foregoing clauses, wherein the circuit comprises at least one indicator light, wherein at least one signal processing element is configured to control the indicator light, based upon the signal received from said at least one signal processing element.

29. Flow meter according to one of the foregoing clauses, wherein the turbine is configured to generate at least one sinusoidal waveform, wherein said waveform constitutes electrical energy generated by said turbine, and wherein said waveform acts as flow characteristic related signal related to the fluid flowing through the single interior channel.

30. Flow meter according to one of the foregoing clauses, wherein the circuit comprises at least one storage for storing electrical energy, in particular a capacitor or a battery.

31. Flow meter according to one of the foregoing clauses, wherein the circuit comprises at least one electrical load disconnecting switch and/or at least one electrical load reducing switch connected to and controllable by at least one signal processing element, and/or wherein the circuit comprises at least one constant load, in particular a constant power load, and/or at least one regulated load.

32. Flow meter according to one of the foregoing clauses, wherein the signal processing circuit comprises an electrical load regulating circuit.

33. Flow meter according to one of the foregoing clauses, wherein the signal processing circuit is configured to regulate and/or to use the actual electrical load, preferably to determine at least one flow characteristic of the fluid.

34. Flow meter according to one of the foregoing clauses, wherein the signal processing circuit comprises an electrical load regulating circuit and/or load predicting and/or load measuring circuit, preferably to determine at least one flow characteristic of the fluid.

35. Flow meter according to one of the foregoing clauses, wherein the signal processing circuit is configured to regulate, predict and/or measure the electric load of the circuit, preferably to determine at least one flow characteristic of the fluid.

36. Flow meter according to one of the foregoing clauses, wherein the signal processing circuit comprises an electrical load regulating circuit and/or load predicting and/or load measuring circuit, preferably to determine at least one flow characteristic of the fluid.

37. Flow meter according to one of the foregoing clauses, wherein the circuit comprises at least one electronic transmitter configured to transmit at least one signal to an external receiver, wherein the transmitter is preferably configured for wireless communication.

38. Flow meter according to one of the foregoing clauses, wherein the circuit comprises at least one electronic receiver configured to receive signals from an external transmitter, preferably via wireless communication 39. Flow meter according to one of the foregoing clauses, wherein the turbine is an axial reaction turbine.

40. Assembly of at least one flow meter according to one of the foregoing clauses and at least one signal receiving device configured to receive signals produced and transmitted by said flow meter.

41. Assembly according to clause 40, wherein the flow meter and at least one signal receiving device are configured to communicate wirelessly.

42. Method for measuring at least one flow characteristic, in particular the flow rate, of a fluid flowing through a flow meter according to one of clauses 1-39, comprising the steps of:

A) allowing a fluid to flow through the single interior channel causing the fluid to act a force onto the blades of the rotor resulting in axial rotation of the rotor and the generation of alternating current (AC) and/or alternating voltage (AC voltage) electrical energy, wherein the alternating current and/or alternating voltage is representative for the number of revolutions per time unit, in particular the number of revolutions per minute (rpm), of the rotor, and wherein substantially all fluid, or at least sufficient fluid, flows through the rotor, B) powering at least one electric signal processing circuit by said electrical energy, C) detecting the number of revolutions (rpm) of the rotor by means of said circuit, and D) producing at least one flow characteristic, in particular flow rate, related signal related to the fluid flowing through the single interior channel, based upon the detected number of revolutions (rpm) of the rotor, and based upon a predefined relation between the number of revolutions (rpm) of the rotor and said flow characteristic, in particular the flow rate.

43. Method according to clause 42, wherein steps A) and B) and C), and optionally D), overlap in time.

44. Method according to clause 42 or 43, wherein during step C) the turbine operates either substantially without electric load of the circuit or with a, preferably regulated, predefined electric load, in particular constant power load, of the circuit.

45. Method according to one of clauses 42-44, wherein during step D) at least one flow characteristic, in particular flow rate, related signal related to the fluid flowing through the single interior channel is produced, based upon the detected number of revolutions per time unit (rpm) of the rotor, and based upon a predefined relation between the number of revolutions per time unit (rpm) of the rotor and said flow characteristic, in particular the flow rate, and based upon the electrical load applied during step C).

46. Method according to one of clauses 42-45, wherein during step C) the electrical load of the circuit is measured, and wherein during step D) at least one flow characteristic, in particular flow rate, related signal related to the fluid flowing through the single interior channel is produced, based upon the detected number of revolutions per time unit (rpm) of the rotor, and based upon a predefined relation between the number of revolutions per time unit (rpm) of the rotor and said flow characteristic, in particular the flow rate, and based upon the electrical load measured during step C).

47. Method according to clause 46, wherein the flowmeter is subjected to a self-calibration based upon the electrical load measured during step C), preferably either based upon a no-load measurement and/or based upon a regulated load measurement, in particular by switching between (i) an unregulated load measurement and (ii) a no-load measurement and/or a regulated load measurement.

48. Method according to one of clauses 45-47, wherein during step D) an electrical load dependent flow characteristic correction factor is retrieved from a prestored cross-reference flow-rpm database, preferably a cross-reference load-flow-rpm database, to correct the measured flow characteristic based upon the load applied during step C).

49. Method according to one of clauses 45-48, wherein during step D) an electrical load dependent flow characteristic correction factor is calculated, by using at least one prestored algorithms, to correct the measured flow characteristic based upon the load applied during step C).

The invention will be elucidated on the basis of non-limitative exemplary embodiments shown in the following figures. Herein shows:

FIG. 1 a schematic representation of a turbine flow meter according to the invention;

FIG. 2a a side view of a second embodiment of a turbine flow meter according to the invention;

FIG. 2b a cross section of the turbine flow meter shown in FIG. 2a;

FIG. 3a a cross section of a first possible embodiment of a turbine according to the invention;

FIG. 3b a cross section of a second possible embodiment of a turbine according to the invention;

FIG. 3c a cross section of a third possible embodiment of a turbine according to the invention;

FIG. 3d a cross section of a fourth possible embodiment of a turbine according to the invention;

FIG. 4 a cross section of a fifth possible embodiment of a turbine according to the invention;

FIG. 5 a scheme of the electrical circuitry powered by a turbine according to the invention;

Figure 1:
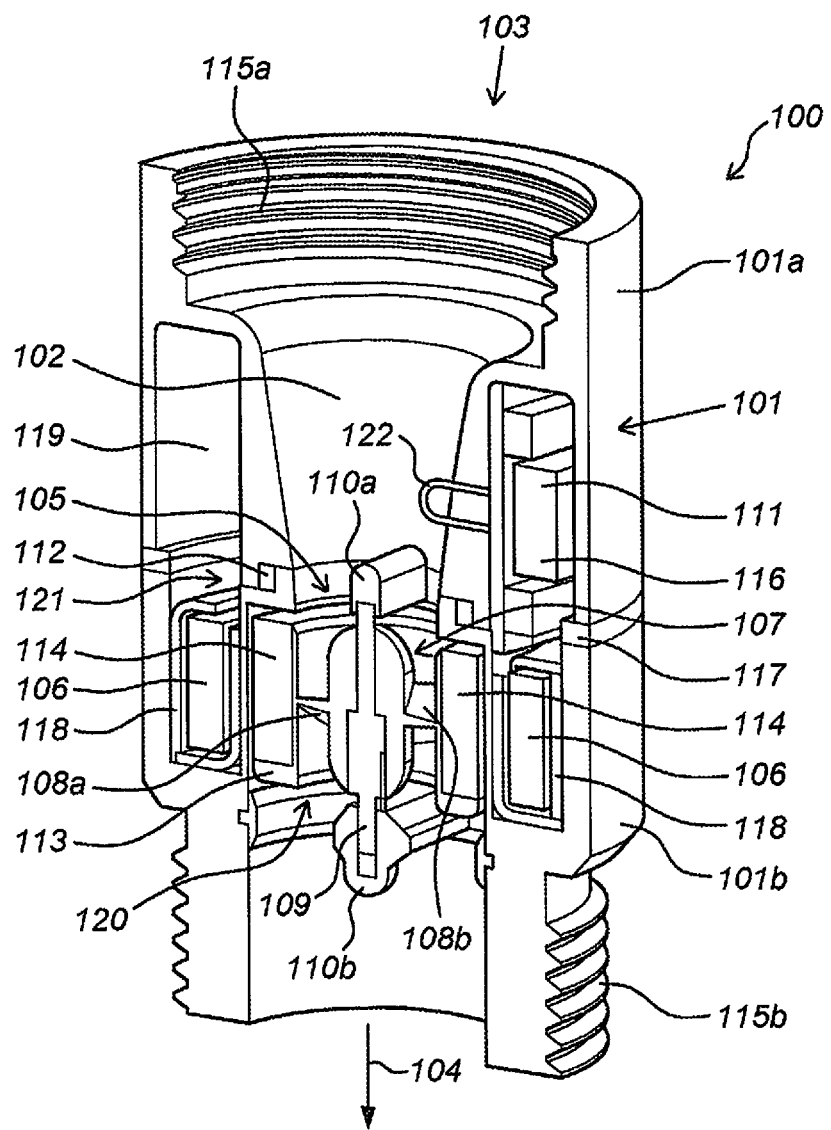

FIG. 1 shows an autonomous, low-power turbine flow meter (100) according to the invention, comprising a housing (101) enclosing a single interior channel (102) with a fluid inlet (103) and a fluid outlet (104), wherein said housing (101) is adapted to be coupled to a conduit (not shown) through which a fluid is caused to flow. The turbine flow meter (100) further comprises a turbine (105) held in place by said housing (101), wherein the turbine (105) comprises a stator (106) connected to said housing (101) and a rotor (107) with blades (108a, 108b). The rotor (107) is connected to an axially rotatable shaft (109) held in place by bearing elements (110a, 110b) connected to the housing (101). In the shown embodiments the upper bearing (110a) is an integral part of the housing (101b), whereas the lower bearing (110b) is a separate element which is connected to the housing (101). The rotor (107) is positioned within the single interior channel (102) such that substantially all fluid led into said single interior channel (102) will flow through the rotor (107). The turbine (107) is configured to generate electric energy from fluid flowing through said interior channel (102). The flow meter (100) comprises an electric signal processing circuit (111) powered by said turbine (107), said circuit (111) comprising at least one signal processing element, more particular at least one signal producing element (116), which is configured to process at least one flow characteristic related signal related to the fluid flowing through the single interior channel (102). At least one flow characteristic related signal is produced by the turbine itself during flow of fluid through the single interior channel (102) causing the rotor (107) to axially rotate. The single interior channel (102) is a substantially linear channel and is tapered towards the rotor (107). In the shown embodiment, the housing (101) consists of two separate housing parts (101a, 101b) which are watertight connected to each other via a sealing ring (112). The upper part of the housing (101a) and the lower part of the housing (101b) can also be an integral part of a housing (101) made of one piece. The rotor (107) comprises a support structure (113) which encloses the blades (108a, 108b) of the rotor (107). The support structure (113) is provided with a multipole magnet (114) or a plurality of bi-pole magnets (114). In the shown configuration the plurality of magnets (114) forms an annular magnet assembly (114). The stator (106) has an annular configuration and substantially circumvents the rotor (107). The stator (106) comprises a second support structure (118).

The electrical signal processing circuit (111) of the flow meter (100) is connected to the stator (106), for example with a coil inside the stator (106). A LED indicator light (117) is connected to and regulated by the electrical signal processing circuit (111). The LED indicator light (117) can for example have lighting colours and/or light intensity dependent on energy consumption, flow rate, temperature and/or water consumption. Furthermore, a temperature sensor (122), which may also be formed by another type of sensor, is connected to the electrical processing circuit (111).

Both end parts of the housing (101) are provided with coupling means (115a, 115b) for coupling for example a conduit (not shown). In the shown embodiment, the upper part of the housing (101a) comprises coupling means (115a) in the form of screw thread (115a) which is provided inside the upper part of the housing (101a). The lower part of the housing (101b) comprises coupling means (115b) in the form of screw thread (115b) which is provided on the outer diameter of the end part of the lower housing part (101b). The coupling means (115a, 115b) are arranged for coupling complementary coupling means (115a, 115b). The coupling means can be any type of suitable coupling means for conduits and the like, but can also be part of a complete fluid conduit application like for example a faucet or shower. The housing comprises an annular accommodating space (120) for accommodating an upper end of the support structure (113) of the rotor (107). In the shown embodiment this accommodating space (120) is located in the lower part of the housing (101b). The upper part of the housing (101a) comprises a third annular accommodating space (119) for accommodating at least part of the electrical signal processing circuit (111) and/or for example a battery (not shown) to be charged by the turbine. The lower part of the housing (101b) comprises a second annular accommodating space (121) for accommodating the stator (106). The third annular accommodating space (119) is located between the wall of the single interior channel (102) and the outer wall of the housing (101).

FIGS. 2a and 2b show a schematic representation of a second embodiment of a turbine flow meter (200) according to the invention. FIG. 2a shows a side view of the turbine flow meter (200). FIG. 2b shows a cross section of the turbine flow meter (200) shown in FIG. 2a. The turbine flow meter (200) comprises a housing (201) consisting of an upper housing part (201a) and a lower housing part (201b). Both housing parts (201a, 201b) are mutually coupled. A watertight coupling between the upper housing part (201a) and the lower housing part (201b) is obtained by the use of a sealing ring (212). The autonomous, low-power flow turbine (200) comprises a turbine (205). The turbine (205) comprises a stator (206) and a rotor (207). The rotor (207) comprises a plurality of blades (208). The blades (208) are preferably curved blades, as this leads to a good power output and a high efficiency. Furthermore, the curved blade rotor has a stable and predictable flow rate versus speed relation. The housing (201) encloses a single interior channel (202) with a fluid inlet (203) and a fluid outlet (204), wherein said housing (201) is adapted to be coupled to a conduit (not shown) through which a fluid is caused to flow. The inner diameter of the single interior channel (202) substantially corresponds to the outer diameter of the rotor (207). In the shown embodiment, a plurality of dipole magnets (214) forms an annular magnet assembly (214) at the rotor (207). However, the annular magnet assembly (214) can possibly also be formed by a multipole magnet. The rotatable shaft (209) which is connected to the rotor (207) extends in substantially the same direction as the single interior channel (202). The shaft (209) is positioned in the centre of the single interior channel (202). The shaft (209) is held in place by bearing element (210a, 210b) connected to the housing (201). In the shown embodiment the combination of the bearing elements (210a, 210b) and the rotatable shaft (209) have a substantially symmetric configuration. The housing (201) comprises two contact holes (221a, 221b) which are provided in the lower part of the housing (201b). The contact holes (221a, 221b) are arranged for enabling an electrical connection. In the shown embodiment, the housing (201) comprises an outer flange (222). In particular, both the upper housing part (201a) and the lower housing part (201b) comprise an outer flange (222a, 222b) at an outer end of the housing part (201a, 201b). However, it is also possible that the housing (201) of the flow meter (200) has a diameter substantially equal to the diameter of the connected conduit parts (not shown) as to be substantially fully integrated in the conduit. Both end parts of the housing (201) are provided with coupling means (215a, 215b) for coupling for example a conduit (not shown).

The flow meter (200) further comprises an electric signal producing circuit according to the invention (not shown) which is powered by the turbine (205).

Figure 3A:
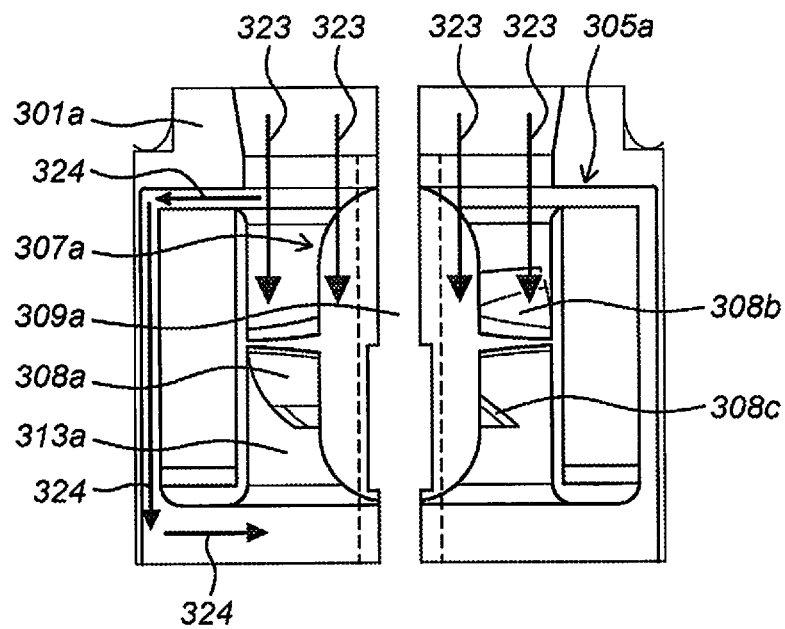
Figure 3B:
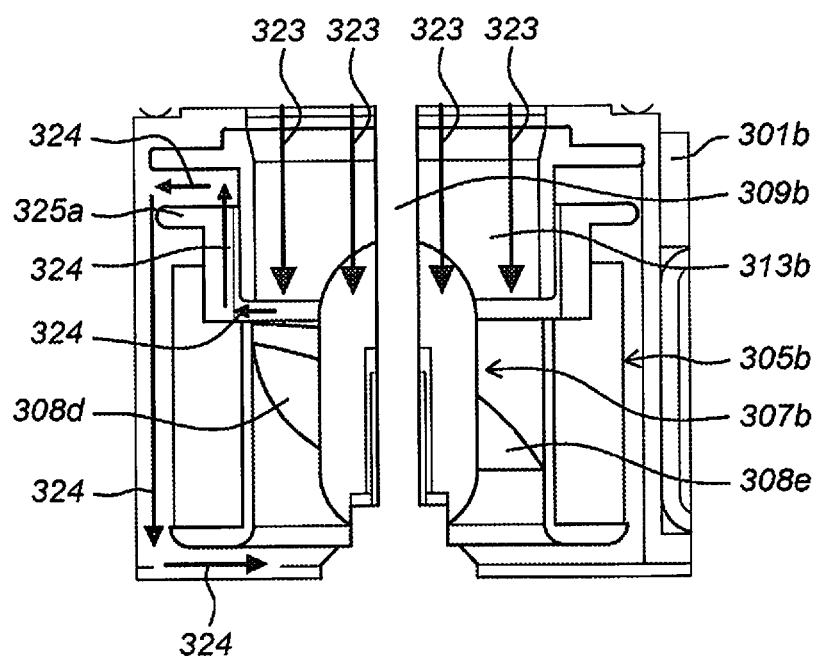
Figure 3C:
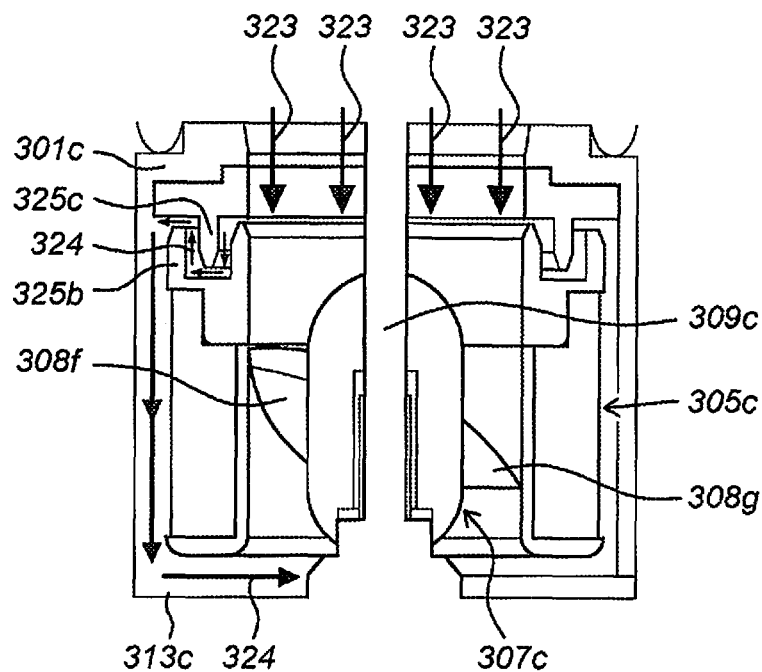
Figure 3D:
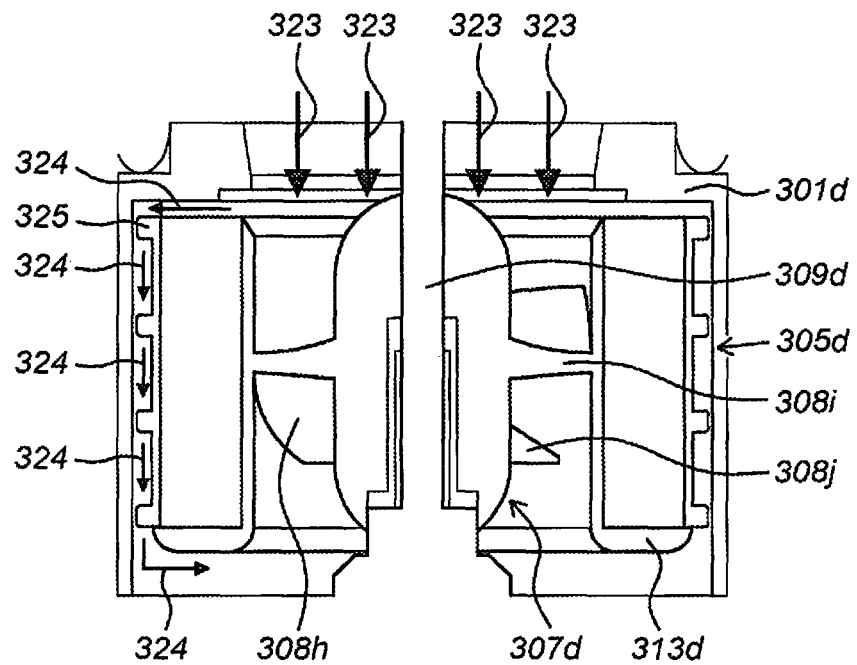

FIGS. 3a-d show cross sections of possible embodiments of a turbine (305a-d) according to the invention applicable in a flow meter according to the invention. In specific, the turbines (305a-d) are axial flow reaction turbines (305a-d). The turbines (305a-d) are held in place by a housing (301a-d). The rotor (307a-d) of each turbines (305a-d) is provided with 3 or 4 blades (308a-j), a number of which are shown in the figures. Adjacent blades of the rotor configurations of FIGS. 3a and 3d overlap each other in longitudinal direction. The blades (308a-j) have a curved geometry. The angle enclosed by an inner portion of each blade (308a-j) and the shaft (309a-d) of the rotor (307a-d) is smaller than the angle enclosed by an outer portion of each blade (308a-j) and the shaft (309a-d). An important aspect of the turbines (305b-d) is that they are designed to prevent internal leakage, e.g. fluid flowing in and through an undesired fluid path. Internal leakage is disadvantageous for the efficiency and accuracy of the flow meter. The arrows (323) indicate the direction of the incoming fluid. This is the desired direction of the fluid flow. The arrows (324) show the fluid following an undesired fluid path causing an undesired leakage. The most straightforward positioning of the rotor (305a) in the housing (301a) is shown in FIG. 3a. As can be seen is internal leakage relatively easy to occur as the fluid flow (323) can relatively easy follow the undesired fluid path. FIGS. 3b-3d show that the turbines (305b-d) comprise a labyrinth configuration. This labyrinth construction ensures minimal leakage by introducing a number of obstructions (325a-d) into the undesired fluid path. The obstructions (325a-d) cause a minimization of the internal leakage and a minimization of the internal leakage variation, caused by axial or radial position changes and/or misalignment of the rotor caused during design (tolerance build up), production (variation) or use (bearing wear). The obstructions (325a-d) prevent that internal leakage which occurs due to design, production and use as described above. The labyrinth construction can be fully integrated in a support structure (313a-d) of the rotor (307a-d). Although, it is preferred that part of the labyrinth construction is integrally part of the housing (301a-d). The labyrinth construction is configured to change the direction of the leakage fluid and/or to obstruct the pathway of the leakage fluid. The labyrinth construction is preferably designed such that reducing the size of the channel is not necessary, as a significant reduction of the size of the channel would negatively impact the dirt resistance of the turbine.

FIG. 4 shows a cross section of a fifth possible embodiment of a turbine (405) according to the invention, which is applicable in a flow meter according to the invention. The turbine (405) comprises a housing (401) which can be accommodated in a conduit (not shown). The turbine (405) comprises an axially rotatable rotor (407) which is provided with multiple blades (408a, 408b). The rotor (407) is (slightly) displaceable in axial and radial direction within said housing (401). Hence, some play is present between the rotor (407) and the housing (401). Also the rotor (407) position (orientation) and alignment can vary in axial and radial direction due to variances in the production and assembly process and due to wear (e.g. of the bearings). The turbine (405) is provided with a labyrinth construction comprising two labyrinth components bilaterally engaging the rotor (407). Due to the presence of the play between the rotor (407) and the housing (401), leading to (slight) displaceability of the rotor (407) within the housing (401), the labyrinth construction applied functions as a self-regulated labyrinth, in which the fluid flow, and the fluid flow resistance, through said labyrinth is substantially independent of the position (orientation) of the rotor. The flow through the labyrinth is independent of both axial and radial movement or misalignment of the turbine (405), because the total cross-section surface of the fluid bypass path (424), and the related fluid flow through the bypass path, will not change when the position of the rotor (407) changes radially or axially. The arrows (423a) indicate the direction of fluid flowing into the turbine (405). Arrows (423b) indicate the direction of fluid leaving the turbine (405).

Figure 5:
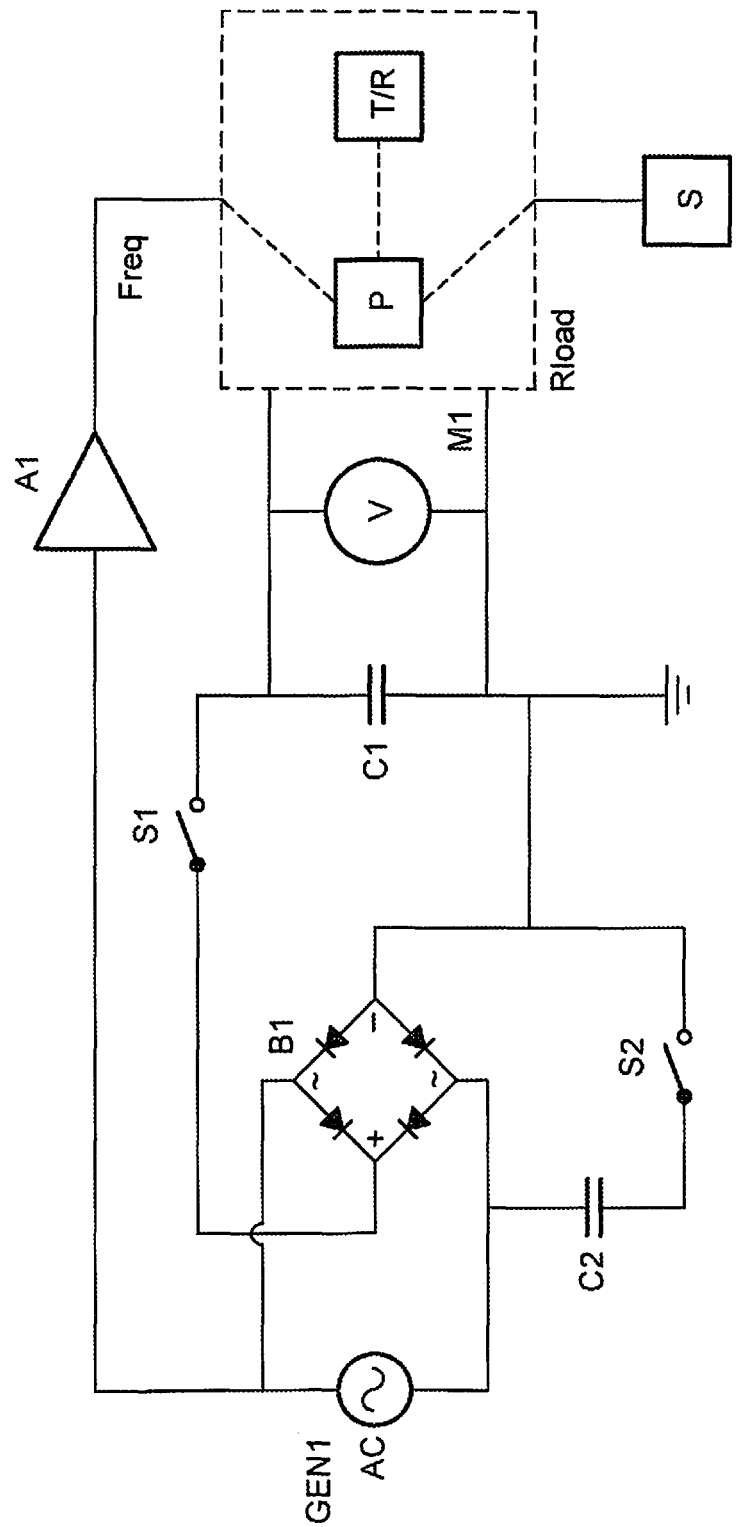

FIG. 5 shows a scheme of the electrical circuit powered by a turbine according to the invention. The generator GEN1 producing an alternating current AC is coupled to a bridge rectifier B1. The resulting rectified voltage is applied via switch S1 to a storage capacitor C1 and energy consuming load Rload. Rload is preferably formed by at least one (central) processor P and/or a transmitter T and/or receiver R. The (central) processor P uses the signal of voltage monitor means M1 (voltage meter) to set switch S1 and S2 and uses the signal of Amplifier A1 for measuring a flow characteristic. Voltage meter M1 is monitoring the voltage on the storage capacitor. It is conceivable that the processor P is configured to measure voltage (and therefore may act as voltage meter) and/or is configured to act as amplifier. The storage capacitor is chosen large enough to be able to store sufficient energy for short amounts of time, for example to turn on a radio transceiver to transmit a short message with sensor data. Switch S2 can be closed when not enough voltage is present due to for example a low fluid flow. Then the rectifier B1 acts as a voltage doubler. The value of the capacitor C2 can be chosen such that the inductance of the generator GEN1 is resonating at the frequency or rpm where the highest efficiency is needed; the effect of capacitor C2 is to improve the power factor of the generator, while in voltage doubling mode. The switch S1 is also used to protect the load and capacitor against excessive voltages caused by very high flowrates. When a too high voltage is detected on C1 by voltage meter M1, the switch is opened and the system and load is supplied from the energy in the storage capacitor C1, until the voltage on C1 needs to be replenished by the generator. The voltage meter M1 is initiating the closure of the switch as well. A means of measuring the speed in rpm of the generator is provided by amplifier A1 (acting as signal processing element) converting the generator signal to a square wave signal that can be processed by the subsequent processor (also acting as signal processing element). In case a no-load or reduced load flow measurement is desired, switch S1 can also be used to disconnect or reduce the load by the processor for a period needed to perform a measurement and/or based on for example voltage meter M1 and/or amplifier A1 related information. For other load using measurements, as described earlier, not described here, additional electronics are needed to regulate, predict and measure the load. The processor is also used to perform the fluid flow characteristic(s) measurement(s) based on a predefined and/or stored relation between the rpm related signals, for example the signal A1 or other sensor signals and/or the (actual) load and/or prediction or calculation of the load, and the fluid flowrate through the flow meter, as described in more detail earlier. Optionally, one or more sensors (S) (of which only a single sensor is shown) may be incorporated in the electrical circuit to detect other parameters, like for example environmental parameters (temperature, humidity, etcetera).

Figure 6:
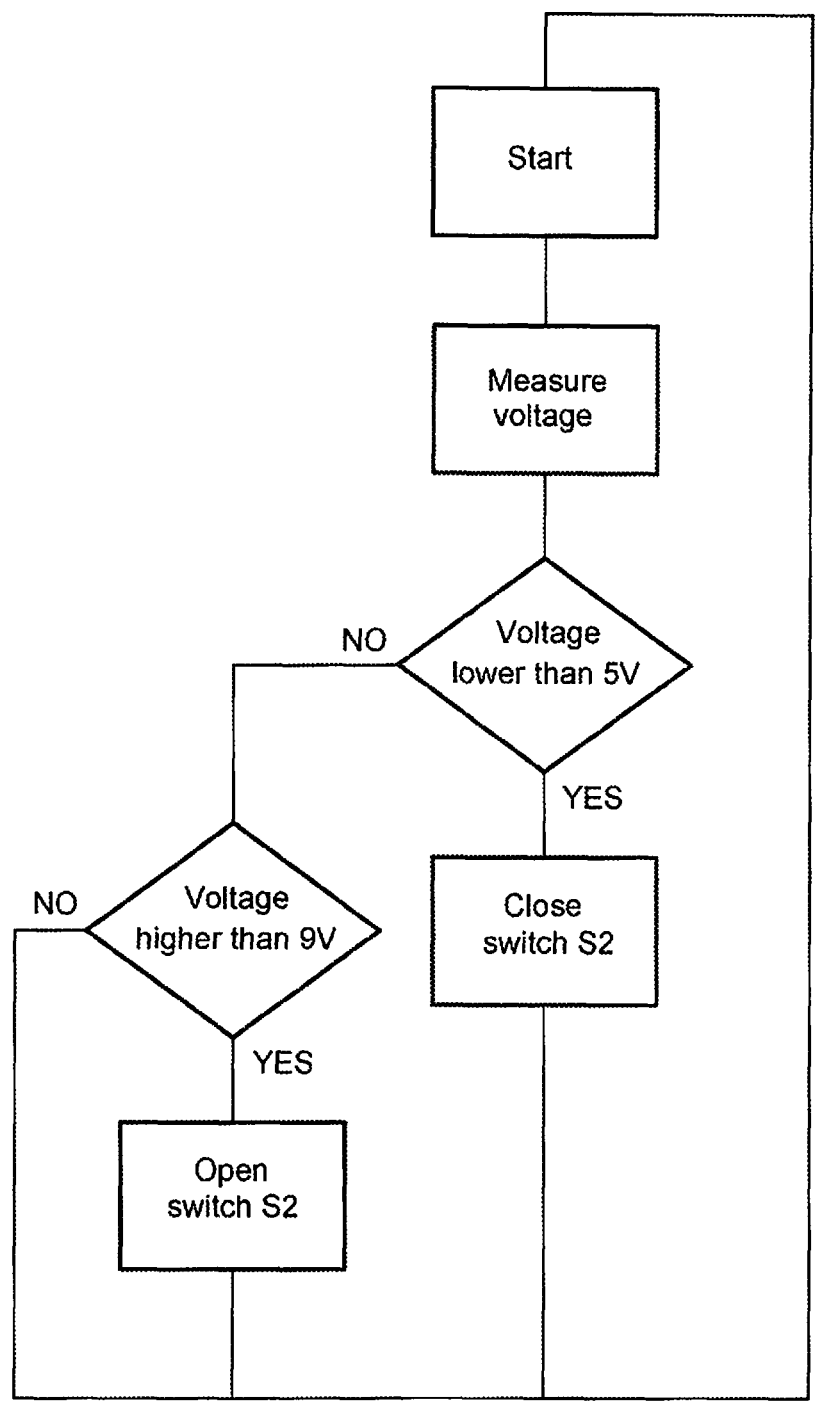
FIG. 6 is related to FIG. 5 and shows a flow chart for low flow conditions.

FIG. 6 is related to FIG. 5 and shows a possible flow chart for low flow conditions. The flow chart shows that the voltage doubler switch S2 is closed when a too low voltage is detected. Switch S2 is opened when a higher voltage is detected and then the diode bridge (bridge rectifier B1) is used to rectify the voltage. The predetermined values of the minimum and maximum allowable voltage can depend on specific conditions.

Figure 7:
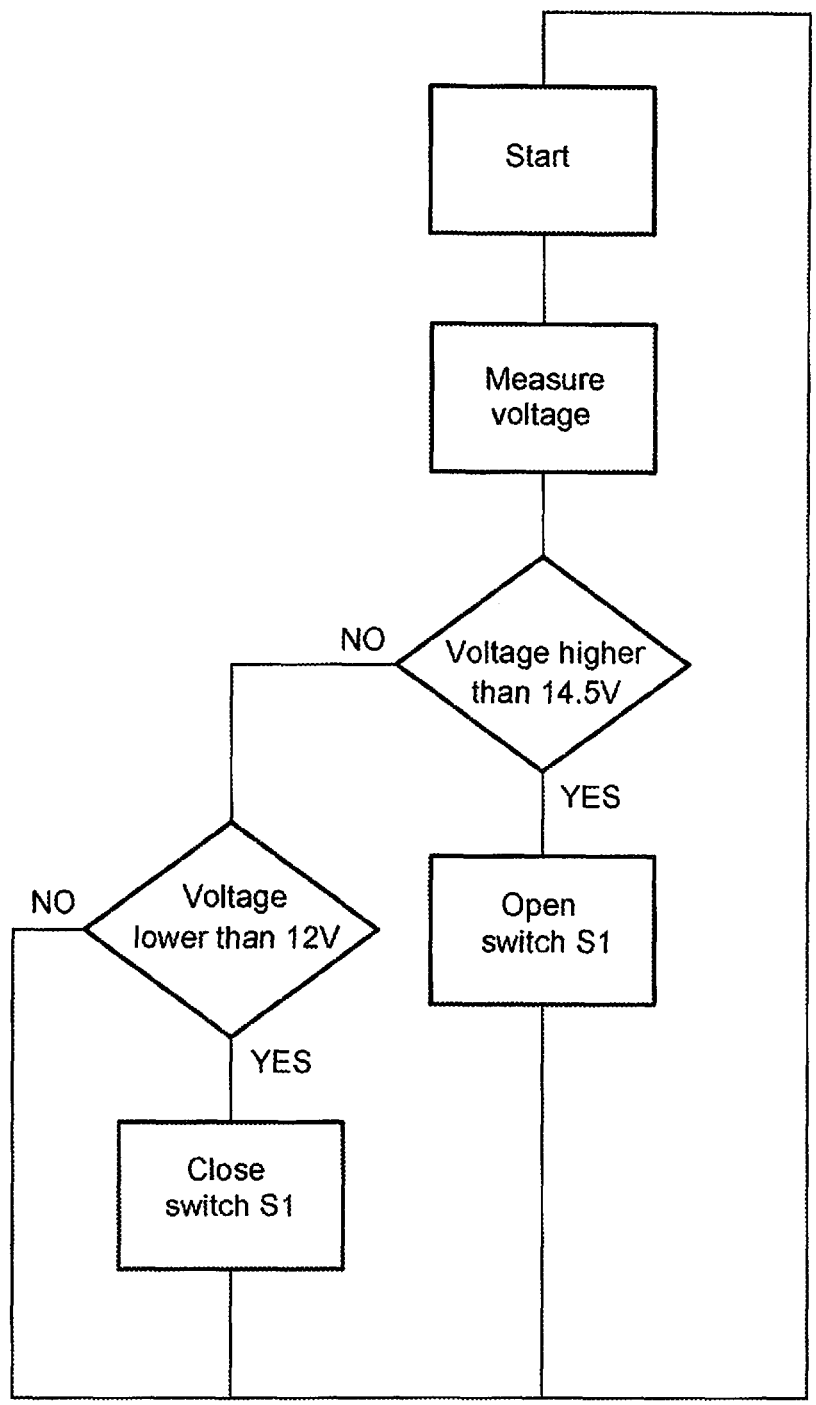
FIG. 7 is related to FIG. 5 and shows a flow chart for high flow conditions.

FIG. 7 is related to FIG. 5 and shows a flow chart for high flow conditions. The flow chart shows that the switch S1 is closed when a too high voltage is detected. The voltage monitor M1 is arranged to protect the electronic circuitry in case of excessive flow conditions. The predetermined values of the maximum allowable voltage can depend on specific conditions.

It will be apparent that the invention is not limited to the working examples shown and described herein, but that numerous variants are possible within the scope of the attached claims that will be obvious to a person skilled in the art.

The above-described inventive concepts are illustrated by several illustrative embodiments. It is conceivable that individual inventive concepts may be applied without, in so doing, also applying other details of the described example. It is not necessary to elaborate on examples of all conceivable combinations of the above-described inventive concepts, as a person skilled in the art will understand numerous inventive concepts can be (re)combined in order to arrive at a specific application.

The verb "comprise" and conjugations thereof used in this patent publication are understood to mean not only "comprise", but are also understood to mean the phrases "contain", "substantially consist of", "formed by" and conjugations thereof.

The invention claimed is:

1. An autonomous, low-power turbine flow meter, comprising:
    a housing enclosing a single interior channel with a fluid inlet and a fluid outlet, wherein said housing is adapted to be coupled to and/or accommodated within a conduit through which a fluid is caused to flow;
    at least one turbine held in place by said housing, wherein each turbine comprises:
        a stator connected to said housing, and
        an axially rotatable rotor with blades, said rotor being connected to a shaft held in place by at least one bearing element connected to said housing, wherein said rotor is positioned within said single interior channel such that at least a fraction of fluid, substantially all fluid, led into said single interior channel will flow through the rotor, and
    wherein said turbine is configured to generate electric energy from fluid flowing through said interior channel, and wherein said turbine is configured to produce at least one flow characteristic related signal related to the fluid flowing through the single interior channel; and
    at least one electric signal processing circuit powered by said turbine, said circuit comprising at least one signal processing element, wherein at least one signal processing element is configured to process said at least one flow characteristic related signal, wherein, during the production of the flow characteristic related signal by the turbine and/or during the processing of said signal by at least one signal processing element, the signal processing circuit uses an electric load of the circuit and/or uses an electric load related characteristic of the circuit, to determine and/or influence the signal production of the turbine and/or the signal processing of at least one signal processing element, wherein the circuit (i) either comprises at least one electrical load disconnecting switch and/or at least one electrical load reducing switch, wherein at least one switch being connected to and controllable by at least one signal processing element, and/or (ii) acts as a constant or regulated load, to produce at least one flow characteristic related signal, and/or (iii) measures the electric load of the circuit and/or at least one electrical load related characteristic of the circuit, to produce at least one flow characteristic related signal.

2. The flow meter according to claim 1, wherein the shaft connected to the rotor is positioned in the centre of the single interior channel.

3. The flow meter according to claim 1, wherein the outer diameter of the rotor substantially corresponds to the inner diameter of the single interior channel.

4. The flow meter according to claim 1, wherein the angle enclosed by an inner portion of each blade and the shaft of the rotor is smaller than the angle enclosed by an outer portion of each blade and the shaft.

5. The flow meter according to claim 1, wherein all adjacent blades of the rotor overlap each other in longitudinal direction.

6. The flow meter according to claim 1, wherein a non-linear fluid bypass path is enclosed by at least one outer edge of the rotor and an inner surface of the housing.

7. The flow meter according to claim 1, wherein at least one of said signal processing element is configured to produce at least one flow rate characteristic related signal related to flow rate of the fluid flowing through the single interior channel and/or at least one flow direction characteristic related signal related to flow direction of the fluid flowing through the single interior channel.

8. The flow meter according to claim 1, wherein the signal processing element is configured to transform at least one flow related signal into at least one other signal, representative for the flow of the fluid through the single interior channel.

9. The flow meter according to claim 1, wherein the circuit comprises at least one sensor, configured as signal processing element to produce a signal representative for at least one fluid characteristic, other than a fluid flow characteristic, of the fluid flowing through the single interior channel.

10. The flow meter according to claim 1, wherein the signal processing circuit comprises an electrical load regulating circuit.

11. The flow meter according to claim 1, wherein the signal processing circuit is configured to regulate and/or to use the actual electrical load, to determine at least one flow characteristic of the fluid.

12. The flow meter according to claim 1, wherein the signal processing circuit comprises an electrical load regulating circuit and/or load predicting and/or load measuring circuit, to determine at least one flow characteristic of the fluid.

13. The flow meter according to claim 1, wherein the signal processing circuit is configured to disconnect, and/or reduce, and/or regulate, and/or predict the electric load of the circuit and/or at least one electrical load related characteristic of the circuit, to determine at least one flow characteristic of the fluid.

14. The flow meter according to claim 1, wherein the signal processing circuit comprises an electrical load regulating circuit and/or load predicting and/or load measuring circuit, to determine at least one flow characteristic of the fluid.

15. An assembly of at least one flow meter according to claim 1, wherein at least one signal receiving device configured to receive signals produced and transmitted by said at least one flow meter.

16. A method for measuring at least one flow characteristic, in particular a flow rate, of a fluid flowing through a flow meter according to claim 1, comprising the steps of:
- A) allowing a fluid to flow through the single interior channel causing the fluid to act a force onto the blades of the rotor resulting in axial rotation of the rotor and the generation of alternating current (AC) and/or alternating voltage (AC voltage) electrical energy, wherein the alternating current and/or alternating voltage is representative for the number of revolutions per time unit, in particular the number of revolutions per minute (rpm), of the rotor, and wherein substantially all fluid, or at least sufficient fluid, flows through the rotor,
- B) powering at least one electric signal processing circuit by said electrical energy,
- C) detecting the number of revolutions (rpm) of the rotor by means of said circuit, and
- D) producing at least one flow characteristic, in particular flow rate, related signal related to the fluid flowing through the single interior channel, based upon the detected number of revolutions (rpm) of the rotor, and based upon a predefined relation between the number of revolutions (rpm) of the rotor and said flow characteristic, in particular the flow rate.

17. The method according to claim 16, wherein during step C) the turbine operates either substantially without electric load of the circuit or with a, regulated, predefined electric load, in particular constant power load, of the circuit, and wherein during step D) at least one flow characteristic, in particular flow rate, related signal related to the fluid flowing through the single interior channel is produced, based upon the detected number of revolutions per time unit (rpm) of the rotor, and based upon a predefined relation between the number of revolutions per time unit (rpm) of the rotor and said flow characteristic, in particular the flow rate, and based upon the electrical load applied during step C).

18. The method according to claim 16, wherein during step C) the electrical load of the circuit is measured, and wherein during step D) at least one flow characteristic, in particular flow rate, related signal related to the fluid flowing through the single interior channel is produced, based upon the detected number of revolutions per time unit (rpm) of the rotor, and based upon a predefined relation between the number of revolutions per time unit (rpm) of the rotor and said flow characteristic, in particular the flow rate, and based upon the electrical load measured during step C).

19. The method according to claim 16, wherein the flow-meter is subjected to a self-calibration based upon the electrical load measured during step C), either based upon a no-load measurement and/or based upon a regulated load measurement, in particular by switching between (i) an unregulated load measurement and (ii) a no-load measurement and/or a regulated load measurement.

20. The method according to claim 16, wherein during step D) (i) an electrical load dependent flow characteristic correction factor is retrieved from a prestored cross-reference flow-rpm database, a cross-reference load-flow-rpm database and/or (ii) an electrical load dependent flow characteristic correction factor is calculated, by using at least one prestored algorithms, to correct the measured flow characteristic based upon the load applied during step C).

* * * * *